Figure 1:
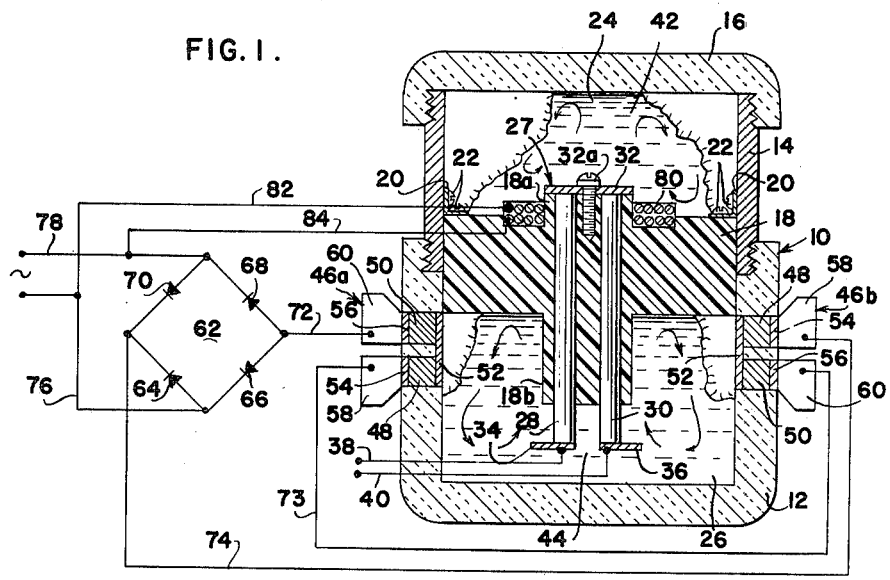

Sept. 13, 1960 R. W. FRITTS 2,952,724
CONSTANT ENERGY SOURCE
Filed Oct. 30, 1957

INVENTOR.
ROBERT W. FRITTS
BY
*Seegert & Schwalbach*
ATTORNEYS

United States Patent Office 2,952,724
Patented Sept. 13, 1960

2,952,724
CONSTANT ENERGY SOURCE

Robert W. Fritts, Elm Grove, Wis., assignor, by mesne assignments, to Minnesota Mining and Manufacturing Company, St. Paul, Minn., a corporation of Delaware Filed Oct. 30, 1957, Ser. No. 693,308

4 Claims. (Cl. 136—4)

This invention relates to constant energy sources, and more particularly to sources in which a constant electrical potential is available from a thermoelectric generator. In order for a thermoelectric generator to provide a source of constant electrical energy, it is necessary that a fixed temperature differential be maintained between the hot and cold thermojunctions thereof. This, of course, can be accomplished by maintaining the hot and cold thermojunctions at predetermined fixed temperatures, but heretofore no satisfactory means has been available for maintaining such fixed temperatures. Common temperature controlling means operate on the principle of correcting for any departure from the predetermined temperature and for this reason cannot maintain a constant temperature. In certain applications the maintenance of a predetermined temperature level depends upon continuous energization of the temperature controlling means at a constant value, and any variation in the energizing current, however small, results in departure of the temperature from the desired level.

With the above in mind, it is a general object of the present invention to provide apparatus affording a constant energy source and having embodied therein a thermoelectric generator and electroresponsive means for maintaining the thermojunctions of said generator at a constant temperature differential despite slight variations in the energizing current supplied to said electroresponsive means.

Another object of the invention is to provide apparatus of the aforementioned character wherein the means for maintaining the thermojunctions of the generator at a constant temperature differential comprises two constant temperature baths or media with which said thermojunctions are thermally associated and which undergo a change of physical state at predetermined temperatures at which it is desired to maintain the associated generator thermojunctions, said means also including heat transfer means operable when energized to maintain a portion of each of said media in one physical state, for example solid, and the remainder in the other physical state, for example liquid, such that said media and hence said thermojunctions are maintained constant at the transformation temperature of said media.

A more specific object of the invention is to provide apparatus as aforementioned wherein one of said media is of a character to take a solid state at ambient temperatures and the other is of a character to take a liquid state at ambient temperatures, the heat transfer means being operable to heat said one medium to a temperature above ambient and liquefy a portion thereof, and to cool said other medium to a temperature below ambient and solidify a portion of the latter.

Another object of the invention is to provide apparatus as aforestated wherein the heat transfer means includes a thermoelectric heat pump having semi-metallic thermoelements.

Other objects and advantages of the invention will become apparent as the description proceeds, reference being had to the accompanying drawing illustrating the invention and wherein:

Figure 1 is a vertical sectional view of one form of apparatus constructed in accordance with the principles of the present invention.

Referring to Figure 1 of the drawing, the numeral 10 indicates container means comprising a cup-shaped container portion 12 formed of material having low electrical and thermal conductivity such as rubber or synthetic resinous material, a cylindrical sleeve 14 sealingly threaded into the portion 12 and formed of material, for example metal, of good thermal conductivity, and a cover 16 sealingly threaded onto sleeve 14 and formed of material having low thermal conductivity. A partition wall 18, formed of material having low electrical and thermal conductivity is fixed within container 10 as by brackets 20 and screws 22 securing said partition to sleeve 14. Partition 18 divides the interior of container 10 into a first chamber 24 and a second chamber 26.

Embedded within partition 18 is a thermoelectric generator 27 shown in Figure 1 as comprising thermoelements 28 and 30 having their opposite ends terminating in chambers 24 and 26 respectively. Generator 27 also comprises a thermojunction member 32 of good thermal and electrical conductivity electrically joined to the upper ends of thermoelements 28 and 30 as by a pressure contact therewith. The lower ends of thermoelements 28 and 30 extend to the lower portion of chamber 26 and are electrically joined to thermojunction and terminal members 34 and 36 respectively as by a bonded contact therewith. Screw 32a secures the member 32 to the partition 18 as shown. Connected in circuit with thermojunction and terminal members 34 and 36 are lead wires 38 and 40 respectively, which may be connected, as desired, to a device or apparatus (not shown) requiring energization from a constant energy source.

Each of the chambers 24 and 26 is provided with a fill or medium, identified in Figure 1 by numerals 42 and 44 respectively. The insulating partition wall 18 is enlarged or built up at 18a so as to surround the thermoelements 28 and 29 as they extend into the chamber 24. In like manner, the insulating partition wall 18 is enlarged or built up at 18b so as to surround said thermoelements as they extend into chamber 26. The high degree of contact between fills 42 and 44 and the respective thermojunction members insures that the temperature of the thermo junctions thereat is substantially the same as that of the portions of said fills in contact with said thermojunction members.

For reasons which will hereinafter become apparent, fill 42 may take the form of a material which is transformable, at a temperature somewhat above the temperature of the ambient atmosphere surrounding container 10, from one physical state or phase to another. Ordinary paraffin is an example of one material which meets the above requirement for fill 42 when the temperature of the ambient atmosphere surrounding container 10 is room temperature. Fill 44, on the other hand, may be a material which is transformable at a temperature below ambient from one physical state or phase to another. Water is an example of such a material.

Means is provided for maintaining both of the fills 42 and 44 partially in one physical state and partially in another state so that said fills are constantly at their transformation temperatures. To this end the container portion 12 is formed with suitable openings adjacent the upper end of chamber 26 for sealingly receiving electrically energizable cooling means as, for example, heat pumps 46a and 46b each of which comprises a pair of thermoelements 48 and 50. Heat pumps 46a and 46b each further comprises a thermojunction member 52 which is in good thermal contact with the fill 44 and is fixed to and electrically joins the inner ends of the associated thermoelements 48 and 50. Electrically joined to the outer ends of thermoelements 48 and 50 are thermojunction and terminal members 54 and 56 respectively, which carry heat conducting fins 58 and 60 respectively exposed to the ambient atmosphere.

Means for effecting energization of heat pump 46 comprises a rectifying bridge circuit 62 having four unidirectional conductors or rectifiers 64, 66, 68 and 70 arranged in the conventional manner as shown in the figure. Affording connection between fins 58 of heat pump 46a and fin 60 of heat pump 46b is a conductor 73. Connecting fin 60 of heat pump 46a and fin 58 of heat pump 46b with the output terminals of bridge circuit 62 are lead wires 72 and 74 respectively, while lead wires 76 and 78 afford connection between the input terminals of bridge circuit 62 and a source of alternating current as shown schematically.

Provided within the chamber 24 is heat supplying means which in the illustrated embodiment takes the form of a resistance type heater coil 80 wound about the extended portion 18a of insulating partition wall 18 adjacent thermojunction member 32. The coil 80 is in good thermal contact with the fill 42 and is energized by current from the aforementioned alternating current source through conductors 82 and 84 connected respectively to lead wires 76 and 78.

I prefer to construct thermoelements 28 and 30 of generator 27 and thermoelements 48 and 50 of heat pumps 46a and 46b in a particular manner. More particularly, in order for thermoelements 28 and 30 to provide the desired electrical potential between lead wires 38 and 40 whenever their opposite ends are at predetermined different temperatures and for thermoelements 48 and 50 to pump heat at the desired rate when energized by a current of predetermined magnitude, it is preferred to have said generator and heat pump thermoelements formed of suitable materials which exhibit high Seebeck and Peltier coefficients respectively, low thermal conductivity, and low electrical resistivity. More specifically, generator thermoelements 28 and 30 may be formed of the materials described in Patent No. 2,811,570 or Patent No. 2,811,571. Heat pump thermoelements 48 and 50, on the other hand, may be formed of the materials disclosed in the copending application of Robert W. Fritts and Sebastian Karrer, Serial No. 512,436, now Patent No. 2,896,005. The materials disclosed in the applications referred to are semi-metallic alloys or compositions which may be characterized as binary metallic compounds of slightly imperfect compositions, i.e., containing beneficial impurities constituting departures from perfect stoichiometry by reason of an excess of one of the metals over the other and/or containing added beneficial impurity substances denominated hereinafter "promoters." Such semi-metallic compositions have semiconductor-like conductivity (both electrical and thermal, as aforementioned). Semi-metallic alloys or compositions also include mixtures of such binary metallic compounds, which may be denominated ternary metallic alloys or compositions. Certain of these alloys or compositions exhibit negative and certain exhibit positive electrical characteristics.

Unless some special circumstance arises wherein it is necessary or desirable that the electrical potential developed by generator 27 have a specific polarity with respect to lead wires 38 and 40, the type (positive or negative) of alloys or compositions selected for the specific thermoelements 28 and 30 is immaterial, except that such element should exhibit opposite electrical characteristics in order to develop the maximum potential across lead wires 38 and 40.

The types (positive or negative) of alloy or composition selected for thermoelements 48 and 50 of heat pumps 46a and 46b are dependent upon the direction of current flow through such elements and the direction therethrough in which it is desired to pump heat. Current flow through a thermoelement which exhibits positive electrical characteristics causes heat to be pumped in the direction of current flow therethrough, whereas current flow through a thermoelement which exhibits negative electrical characteristics causes heat to be pumped in the direction opposite to the direction of current flow. Thus, if current flows through the heat pumps from members 54 to members 56, it is necessary that elements 48 exhibit negative electrical characteristics and elements 50 exhibit positive electrical characteristics if it is desired to pump heat out of the chamber 26. If the current flows in the opposite direction, thermoelements 48 and 50 must be of the opposite polarity, i.e. respectively positive and negative, in order to effect pumping of heat from the chamber 26.

The operation of the embodiment shown in Figure 1 is as follows:

By selecting structural elements of proper values for the means which determines the temperature of fills or media 42 and 44 (i.e., heating coil 80, heat pumps 46a and 46b, and the energizing means for both said coil and said heat pumps) continuous current flow through coil 80 can be made to maintain a portion of the fill 42 in one physical state or phase, for example liquid, and the remainder thereof in another physical state or phase, for example solid, whereas continuous energization of heat pump 46 can be made to maintain a portion of fill 44 in one physical state or phase, for example solid, and the remainder thereof in another physical state or phase, for example liquid. As above set forth, this requires the fills 42 and 44 to be transformable from one to another phsysical phase or state at temperatures other than ambient. To be more specific, the amount of current continuously flowing from the alternating current source through heating coil 80 is preferably so related to the transformation temperature of fill 42, i.e., the temperature at which said fill is transformed from one to another physical state, that said coil delivers to the fill 42 substantially the same quantity of heat per unit time as that which is lost from said fill to the ambient atmosphere, for example through member 14 and cap 16, when said fill is at its transformation temperature. This provides a state of thermal equilibrium wherein the fill 42 is continuously maintained at a constant temperature, since for every unit of heat which flows into fill 42 a like unit of heat flows therefrom.

The size of the heater coil 80 and the magnitude of the current energizing the same are so selected that continuous energization of coil 80 causes a sufficient quantity of heat to be delivered to fill 42 per unit time, for approximately one-half of said fill to be transformed into the liquid state, while the remainder of said fill continues in the solid state in which it normally occurs at ambient temperature. Since it is the heat supplied by the coil 80 that causes the fill 42 to be transformed to the liquid state, it is the portion of the fill adjacent said coil 80 which is continuously in said state. While the thermal conductivity of the liquid phase may be somewhat lower than that of the solid phase, the transfer of heat therethrough is more rapid by virtue of the fact that convection can take place in the liquid phase, the convection currents flowing in the directions indicated generally by the arrows in the drawing. Thus, any increase in energization of coil 80 will result in greater portion of the fill 42 being transferred into the liquid state with a resulting increase in the rate of heat transfer through the fill 42 to the environment until a new point of equilibrium is reached at which the quantity of heat per unit time flowing into fill 42 equals the quantity of heat per unit time flowing therefrom. No further phase change takes place so long as the environmental temperature and input power remain unchanged. Upon a decrease in the energization of coil 80, more heat is lost from the fill 42 than is supplied by said coil, and a portion of the liquefied fill reverts to the solid state, reducing ther ate of heat transfer through the fill because of the reduced volume of liquid for transferring heat by convection and bringing about a new state of thermal equilibrium. Due to the latent heat of transformation of the fill 42, the increase or decrease in heat supplied by the coil 80 to said fill and/or the increase or decrease in environmental temperature and the maintenance thereby of a greater or lesser portion of the fill in the liquid state takes place without any variation in the temperature of said fill from its transformation temperature. Thus, a constant temperature bath is provided which is substantially independent of fluctuations in the energization of heating coil 80. As shown in Figure 1 the fill 42 of this constant temperature bath is continuously in contact with the termojunction member 32 of generator 27, so that the thermojunctions formed thereby with thermoelements 28 and 30 are constantly maintained at the transformation temperature of said fill or medium.

The structure of the heat pumps 46a and 46b and the magnitude of the energizing current supplied thereto from the alternating current source are such that continuous energization of said heat pumps causes heat to be pumped from the fill 44 to the ambient atmosphere, causing the portions of said fill in contact with the thermojunction members 52 to be transformed into the solid state, while the remainder of said fill, preferably one-half thereof, continues in the liquid state in which it normally occurs at ambient temperature. Normally, the amount of heat pumped form the fill 44 by pump 46 is substantially equal to the amount of heat which is adsorbed by said fill, for example from fill 42 by conduction through the thermoelements 28 and 30 and from the atmosphere through the container member 12.

Due to the latent heat of transformation of fill 44, any variation in the energization of heat pumps 46a and 46b merely varies the proportion of fill 44 in the solid as compared to that in the liquid state until a new point of equilibrium in reached, as above explained with respect to fill 42. Thus, fill or medium 44 affords a constant temperature bath, the temperature of which is at the transformation temperature of said fill. Since fill 44 is continuously in contact with thermojunction members 34 and 36, it is apparent that the thermojunctions formed thereby with the thermoelements 28 and 30 are constantly maintained at the transformation temperature of said fill. The fills 42 and 44 selected for use in the chambers 24 and 26 have substantially different transformation temperatures, and since the thermojunctions at the opposite ends of the thermoelements 28 and 30 are constantly maintained at these substantially different temperatures in spite of fluctuations in the alternating current source and in the environmental temperature, the generator 27 provides a constant electrical output potential in the manner of a standard cell.

Although I have shown and described a certain specific embodiment of my invention, I am fully aware that many changes and modifications thereof are possible without departing from the spirit of the invention. All of such changes are contemplated as may come within the scope of the apended claims.

What I claim as the invention is:

1. Constant output energy source means comprising, a thermoelectric generator having at least two thermojunctions, a bath comprising a first medium transformable from a solid state to a liquid state at a first predetermined temperature above a predetermined range of abient room temperatures external to said bath, said medium being thermally associated with said ambient atmosphere and with one of said thermojunctions, a bath comprising a second medium transformable from a solid state to a liquid state at a second lower predetermined temperature and thermally associated with another of said thermojunctions, electrically energizable heat transfer means having a heat emitting portion in said first bath and supplying heat to said first medium in quantity sufficient to maintain a portion only of said first medium in a liquid state, said heat transfer means also having a heat absorbing portion in thermal contact with said second medium for extracting heat from said second medium in sufficient quantity to maintain a portion only of said second medium in its solid phase and deposited on said heat absorbing portion, thereby controlling the heat content of both of said media in a manner to cause each of said media to have portions in both liquid and solid states to maintain the temperatures of said media and hence those of the associated thermojunctions constant at the transformation temperatures of said media, the constant temperature differential between said one and another thermojunction thus produced affording said generator constant output potential.

2. Constant output energy source means comprising, a thermoelectric generator having at least two thermojunctions, a bath comprising a first medium transformable from a solid state to a liquid state at a first predetermined temperature above a predetermined range of ambient room temperatures external to said bath, said medium being thermally associated with one of said thermojunctions, a bath comprising a second medium transformable from a solid state to a liquid state at a second lower predetermined temperature and thermally associated with another of said thermojunctions, first heat transfer means having an inner surface in contact with said first medium and an outer surface exposed to the ambient atmosphere for transferring heat from said first medium to said ambient in sufficient quantity to cause a portion only of said first medium to be maintained in its solid phase and deposited on said inner surface, second heat transfer means in said first bath for supplying heat to said first medium in quantity sufficient to maintain a portion only of said first medium in a liquid state, and third heat transfer means having an inner surface in thermal contact with said second medium and an outer surface exposed to the ambient atmosphere for transferring heat from said second medium to said ambient in sufficient quantity to maintain a portion only of said second medium in its solid phase and deposited on said inner surface in contact therewith, thereby controlling the heat content of both of said media in a manner to cause each of said media to have portions in both liquid and solid states to maintain the temperatures of said media and hence those of the associated thermojunctions constant at the transformation temperatures of said media, the constant temperature differential between said one and another thermojunction thus produced affording said generator constant output potential.

3. Constant output energy source means comprising, means defining a container, partition means separating the interior of said container into two chambers, a first medium in one of said chambers transformable from a solid state in which it normally occurs at a predetermined range of ambient room temperature externally of said container to a liquid state at a predetermined first temperature above said ambient, a second medium in the other of said chambers transformable from a liquid state in which it normally occurs at said ambient temperature to a solid state at a predetermined second temperature below said ambient, said means defining said container including a heat transferring wall portion having an inner surface in said first chamber in contact with said first medium and having an externally exposed surface for transferring heat from said first medium to the ambient in sufficient quantity to maintain a portion only of said first medium in a solid phase and deposited on said inner surface, electrically energizable heat transfer means having a heat emitting portion disposed within said one chamber and operable to supply heat to said first medium in quantity sufficient to maintain a portion only of said medium in a liquid phase, said heat transfer means also having a heat absorbing portion disposed within said other chamber in thermal contact with said second medium for extracting heat from said second medium in quantity sufficient to maintain a portion only thereof in its solid phase and deposited on said heat absorbing portion, thereby controlling the heat content of both of said media in a manner to cause each of said media to have portions in both solid and liquid states to maintain the temperatures of said media constant at their transformation temperatures in spite of variations in the magnitude of energization of heat transfer means within a predetermined operating range or variations within said predetermined range in said ambient temperature, and a thermoelectric generator having at least two thermoelements extending through said partition means and joined within said one chamber by thermojunction means in thermal contact with said first medium, said thermoelements also being electrically joined to thermojunction means in said other chamber in thermal contact with said second medium, said generator thermojunction means each being maintained constant at the transformation temperature of the medium with which it is in thermal contact, the constant temperature differential produced between the thermojunction means in said one and said other chambers affording said generator constant output potential.

4. Constant output energy source means comprising, means defining a container, partition means separating the interior of said container into two chambers, a first medium in one of said chambers transformable from a solid state in which it normally occurs at a predetermined range of ambient room temperature externally of said container to a liquid state at a predetermined first temperature above said ambient, a second medium in the other of said chambers transformable from a liquid state in which it normally occurs at said ambient temperature to a solid state at a predetermined second temperature below said ambient, said means defining said container including a heat transferring wall portion having an inner surface in said first chamber in contact with said first medium and having an externally exposed surface for transferring heat from said first medium to the ambient in sufficient quantity to maintain a portion only of said first medium in a solid phase and deposited on said inner surface, an electrical resistance type heater disposed within said one chamber and operable to supply heat to said first medium in quantity sufficient to maintain a portion only of said medium in a liquid phase, a thermoelectric heat pump having heat absorbing thermojunction means in said other chamber in contact with said second medium and having externally exposed heat emitting thermojunction means for pumping heat from said second medium to the ambient in sufficient quantity to maintain a portion only of said second medium in a solid phase and deposited on said heat absorbing thermojunction means, thereby controlling the heat content of both of said media in a manner to cause each of said media to have portions in both solid and liquid states to maintain the temperatures of said media constant at their transformation temperatures in spite of variations in the magnitude of energization of said heater and heat pump within a predetermined operating range or variations within said predetermined range in said ambient temperature, and a thermoelectric generator having at least two thermoelements extending through said partition means and joined within said one chamber by thermojunction means in thermal contact with said first medium, said thermoelements also being electrically joined to thermojunction means in said other chamber in thermal contact with said second medium, said generator thermojunction means each being maintained constant at the transformation temperature of the medium with which it is in thermal contact, the constant temperature differential produced between the thermojunction means in said one and said other chambers affording said generator constant output potential.

References Cited in the file of this patent

UNITED STATES PATENTS

| | | |
|---|---|---|
| 2,417,923 | Frisk | Mar. 25, 1947 |
| 2,463,944 | Borden | Mar. 8, 1949 |
| 2,595,814 | Rich et al. | May 6, 1952 |
| 2,685,608 | Justi | Aug. 3, 1954 |
| 2,811,571 | Fritts et al. | Oct. 29, 1957 |

UNITED STATES PATENT OFFICE
CERTIFICATE OF CORRECTION

Patent No. 2,952,724             September 13, 1960

Robert W. Fritts

It is hereby certified that error appears in the above numbered patent requiring correction and that the said Letters Patent should read as corrected below.

Column 3, line 11, for "the figure" read -- Figure 1 --; column 4, line 34, for "phsysical" read -- physical --; column 5, line 17, for "termojunction" read -- thermojunction --; line 34, for "adsorbed" read -- absorbed --; line 41, for "in" read -- is --; line 63, for "apended" read -- appended --; line 70, for "abient" read -- ambient --.

Signed and sealed this 5th day of September 1961.

(SEAL)
Attest:

ERNEST W. SWIDER             DAVID L. LADD
Attesting Officer             Commissioner of Patents

USCOMM-DC